United States Patent [19]
Humphrey

[11] Patent Number: 6,125,218
[45] Date of Patent: Sep. 26, 2000

[54] FIBER OPTIC PRESSURE SENSITIVE OPTICAL SWITCH AND APPARATUS INCORPORATING SAME

[76] Inventor: Ashley C. Humphrey, 3413 Hammond Bay Road, Nanaimo, British Columbia, Canada, V9T 1E7

[21] Appl. No.: 09/044,255

[22] Filed: Mar. 19, 1998

[51] Int. Cl.$^7$ .................................................. G02B 6/35
[52] U.S. Cl. ............................. 385/19; 385/13; 250/577
[58] Field of Search ................................. 385/19, 12, 13; 250/577; 73/861.47

[56] References Cited

U.S. PATENT DOCUMENTS

| | | | |
|---|---|---|---|
| 3,120,125 | 2/1964 | Vasel | 73/293 |
| 4,631,401 | 12/1986 | Parkhurst et al. | 250/227 |
| 4,935,621 | 6/1990 | Pikulski | 250/229 |
| 4,954,724 | 9/1990 | Koda et al. | 250/577 |
| 5,175,780 | 12/1992 | Sano et al. | 385/47 |
| 5,189,979 | 3/1993 | Popenoe | 116/273 |
| 5,196,694 | 3/1993 | Berthold et al. | 250/227.16 |
| 5,351,547 | 10/1994 | Grudzien, Jr. et al. | 73/705 |
| 5,446,279 | 8/1995 | Hsu | 250/227.21 |
| 5,745,611 | 4/1998 | Komachiya et al. | 385/13 |

*Primary Examiner*—John D. Lee
*Assistant Examiner*—Victoria D. Hao
*Attorney, Agent, or Firm*—Terrance L. Siemens

[57] ABSTRACT

An optical switch operatively sensitive to a fluid pressure differential includes a house having an open end, a fiber optic input line, a fiber optic output line, and a fluid-proof diaphragm sealingly engaged with the housing. The diaphragm is formed from a thin elastic material resiliently stretchable between first and second switching states and supports an optical barrier within the housing for blocking the propagation of an optical signal between the fiber optic lines when the diaphragm is in one switching state and for permitting the propagation of the signal between the fiber optic lines when the diaphragm is in the other one of the switching states. For a given housing and a given diaphragm, different optical barriers may be employed to achieve different switching thresholds. As well differing optical barriers may be used to make the switch either a normally "on" switch or a normally "off" switch. Apparatus for monitoring the level of a liquid may include a plurality of such switches.

19 Claims, 4 Drawing Sheets

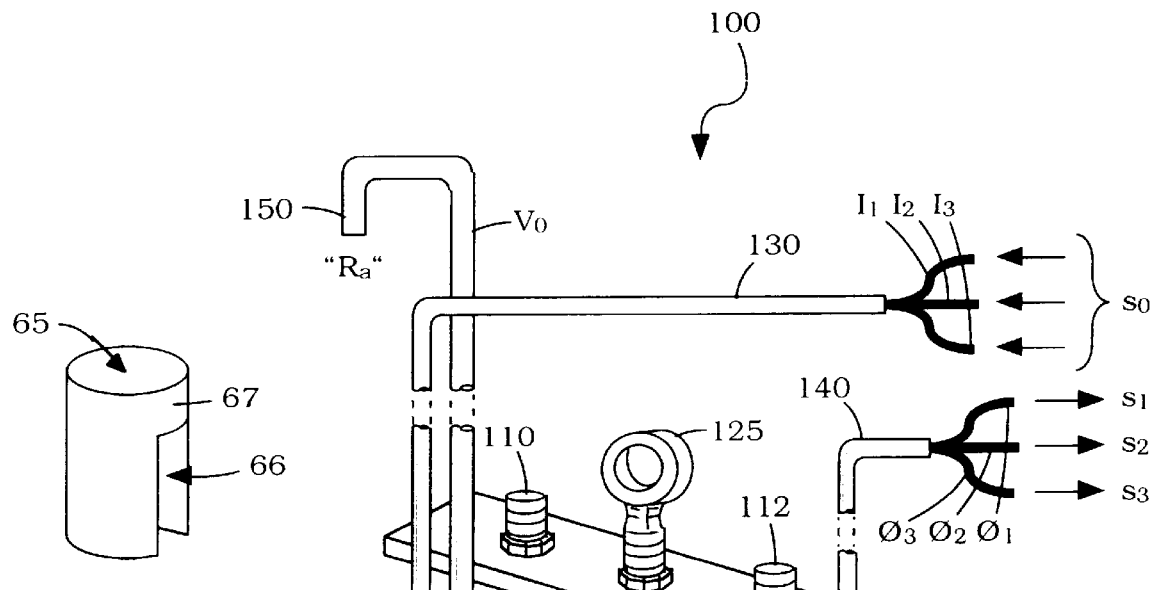
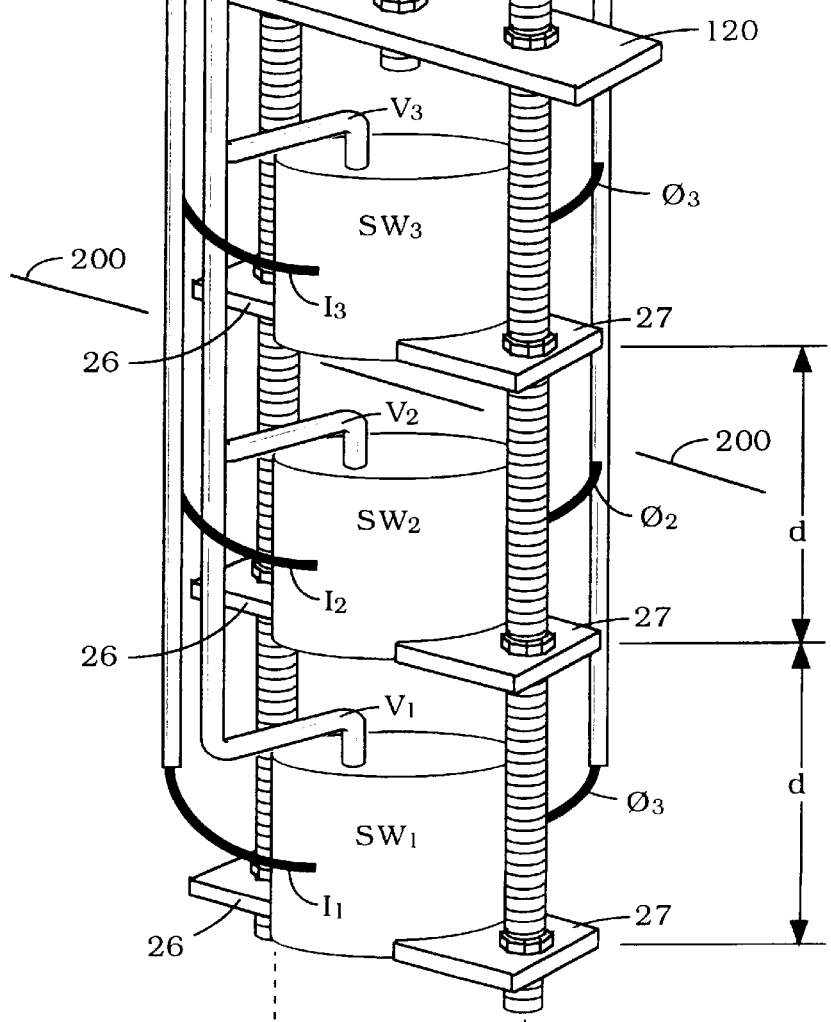
FIG. 7
FIG. 8

FIBER OPTIC PRESSURE SENSITIVE OPTICAL SWITCH AND APPARATUS INCORPORATING SAME

FIELD OF THE INVENTION

The present invention relates to pressure sensitive optical switches and to apparatus comprising a plurality of such switches that is particularly suitable for monitoring the level of a liquid.

BACKGROUND TO THE INVENTION

The use of optical fibers produced from glass, plastic or synthetic fused silica, often called silica or quartz fiber, is well known. One area where fiber optic technology has been developed to play a significant role is for the detection or measurement of liquid levels. In this regard, and as is indicated in U.S. Pat. No. 5,072,617 granted to Weiss on Dec. 17, 1991, the detection of liquid level is one of many functions for which fiber optic sensors may be more suitable than their electrical counterparts, especially in noisy or hostile environments.

In some applications, it may be highly desirable to provide a continuous indication of pressure or liquid level. However, in many applications, it may be quite sufficient to detect pressure or liquid levels at discrete levels. By way of example, if it is desired to monitor the level of a crude oil or other liquid within a hold of a ship, then it may be sufficient to detect the fullness of the hold within increments of 25%. Continuous measurements together with the relatively complex design considerations and instrumentation required to effect such measurements over broad pressure ranges may be considered unnecessary and impractical.

The prior art includes a variety of fiber optic devices that are designed to react to external fluid pressures applied to the device, whether as the result of a rising liquid level or otherwise. One class of such devices relies upon the use of a flexible membrane or diaphragm that resiliently stretches in response to external pressure and, in so doing, modifies the transmission of optical signals being carried to an from the device by fiber optic lines. Advantageously, the operation of devices that incorporate a pressure sensitive diaphragm generally does not depend upon the transmission of optical signals through the fluid medium under scrutiny. Accordingly, the operation is independent of the optical properties of the fluid.

One example of a pressure sensitive device that utilizes a flexible diaphragm is disclosed in U.S. Pat. No. 5,408,546 granted to Slaker et al. on Apr. 18, 1995. In this case, an optical signal is transmitted within a cylindrical housing or probe from one end and reflected back from an opposite end. The reflected signal is then detected at the first end. An opening in the wall of the housing is covered by a flexible membrane or diaphragm that normally appears to bulge into the housing and into the path of a transmitted signal. As disclosed, the device is apparently designed and used for continuous pressure measurements which are negative with respect to an ambient pressure and it is not clear how it might be easily adapted to sense or detect increasing positive pressure in a switching mode. In any case, for a given housing and a given diaphragm, the operating characteristics would be largely fixed. It does not appear that such characteristics could be altered except by using a diaphragm having different resilient characteristics and/or by modifying the size of the diaphragm in relation to the housing. Further, if the device could be adapted to sense or detect positive pressures in a switching mode, the device would be a normally "on" switch, and it is not apparent how it might be modified to operate as a normally "off" switch if a normally "off" characteristic was desired.

The patent to Weiss, supra, is another example of a pressure sensitive device that utilizes a flexible diaphragm. Weiss discloses a fiber-optic liquid level sensor that measures the height of a column of liquid through the hydrostatic pressure produced by the column on the diaphragm. As in the case of Shaker et al., the design of Weiss is intended for continuous measurements. But, unlike Slaker et al. where the diaphragm bulges into the path of a transmitted optical signal, the diaphragm of Weiss is used as a reflector that always stands completely in the path of a transmitted signal. The angle of reflection varies depending upon the degree of bulge thereby varying the signal intensity as seen by an associated signal detector. Such an arrangement requires a reflective diaphragm and the careful maintenance of optical alignment between input and output fiber optic lines and the diaphragm. Further, as in the case of Slaker et al., the operating characteristics of the device would be largely fixed for a given diaphragm.

A primary object of the present invention is to provide a new and improved pressure sensitive optical device of the class that utilizes a flexible diaphragm and that is particularly suitable for operation as an optical switch having on and off switching states.

A further object of the present invention is to provide a pressure sensitive optical switch where, for a given diaphragm, differing switching thresholds can be achieved with minimal design variation.

A still further object of the present invention is to provide a pressure sensitive optical switch where, for a given diaphragm, the switch may be operated as a normally "on" switch or, with minimal design variation, as a normally "off" switch.

Yet another object of the present invention is to provide new and improved apparatus utilizing a plurality of such switches for monitoring the level of a liquid.

SUMMARY OF THE INVENTION

In a broad aspect of the present invention, there is provided an optical switch operatively sensitive to a fluid pressure differential, the switch comprising a housing having an open end, a fiber optic input line, a fiber optic output line, and a fluid-proof diaphragm sealingly engaged with the housing across the open end to define a region inside the housing and a region outside the housing. The fiber optic input line includes an input end for receiving an optical input signal from an optical source outside the housing, and an output end in the inside region for providing the optical input signal as an optical output signal propagating within the inside region. The fiber optic output line includes an input end in the inside region in optical alignment with the output end of the input line for receiving the propagating signal, and an output end for transmitting the propagating signal, when so received, as an optical output signal from the switch.

The diaphragm is formed from a thin elastic material resiliently stretchable between a first switching state which subsists when fluid pressure in the outside region equals fluid pressure in the inside region and a second switching state which subsists when fluid pressure in the outside region exceeds fluid pressure in the inside region by a predetermined amount. An optical barrier supported by the diaphragm extends within the inside region for blocking the propagation of an optical signal from the output end of the input line to the input end of the output line when the diaphragm is in one of the switching states and for permitting the propagation of the optical signal from the output end of the input line to the input end of the output line when the diaphragm is in the other one of the switching states. For a given housing and a given diaphragm, different optical barriers may be employed to achieve different switching thresholds.

Preferably, the optical barrier is centrally positioned on the diaphragm. It will then move a maximum distance as the diaphragm stretches between the first and second switching states. Also, the open end of the housing preferably has a circular perimeter. The switch will then have a maximum sensitivity to pressure changes because stretching forces on the diaphragm will be distributed over a maximum surface area.

As will become more apparent hereinafter, the optical barrier may be constructed such that the switch operates as a normally "on" switch or as a normally "off" switch. In the case of a normally "on" switch, the optical barrier permits propagation of an optical signal when the diaphragm is in its first switching state and blocks propagation of the optical signal when the diaphragm is in its second switching state. Conversely, in the case of a normally "off" switch, the optical barrier permits propagation of an optical signal when the diaphragm is in its second switching state and blocks propagation of the optical signal when the diaphragm is in its first switching state.

In a preferred embodiment, an optical switch in accordance with the present invention further includes a vent for reaching from the region inside the housing to a region of ambient pressure distant from the housing. Such a vent will serve to maintain the inside region at ambient pressure regardless of the pressure immediately outside the housing. Moreover, such a vent advantageously enables the sealed integrity of an assembled switch to be readily checked.

In another aspect of the present invention there is provided apparatus for monitoring the level of a liquid, such apparatus comprising a plurality of optical switches as described above and a support for holding the switches in spaced succession. The diaphragm of each of the switches is stretchable between the first and second switching states of the switch in response to the rise of the liquid from a level below the switch to a level at which the switch is immersed to a predetermined depth in the liquid.

Typically, it is contemplated that such apparatus may be used to monitor the level of liquid in a tank or other container at (for example, crude oil in a hold of a ship) at discrete increments such as ¼ full, ½ full, ¾ full or completely full. If the tank has a uniform horizontal cross-section from top to bottom (e.g. an upright cylindrical tank) then the space between successive ones of the switches will be equidistant to enable such measurements. On the other hand, if the tank has a non-uniform horizontal cross-section from top to bottom (e.g. a cylindrical tank lying on its side), then the space between successive ones of the switches will be correspondingly non-uniform to enable such measurements.

The foregoing and other features and advantages of the present invention will now be described with reference to the drawings.

BRIEF DESCRIPTION OF THE DRAWINGS

FIG. 7 is a perspective view of the optical barrier forming part of the optical switch shown in FIGS. 5 and 6.

FIG. 8 is a partially diagrammatic and partially schematic view of apparatus in accordance with the present invention for monitoring the level of a liquid.

DETAILED DESCRIPTION OF PREFERRED EMBODIMENTS

Figure 1:
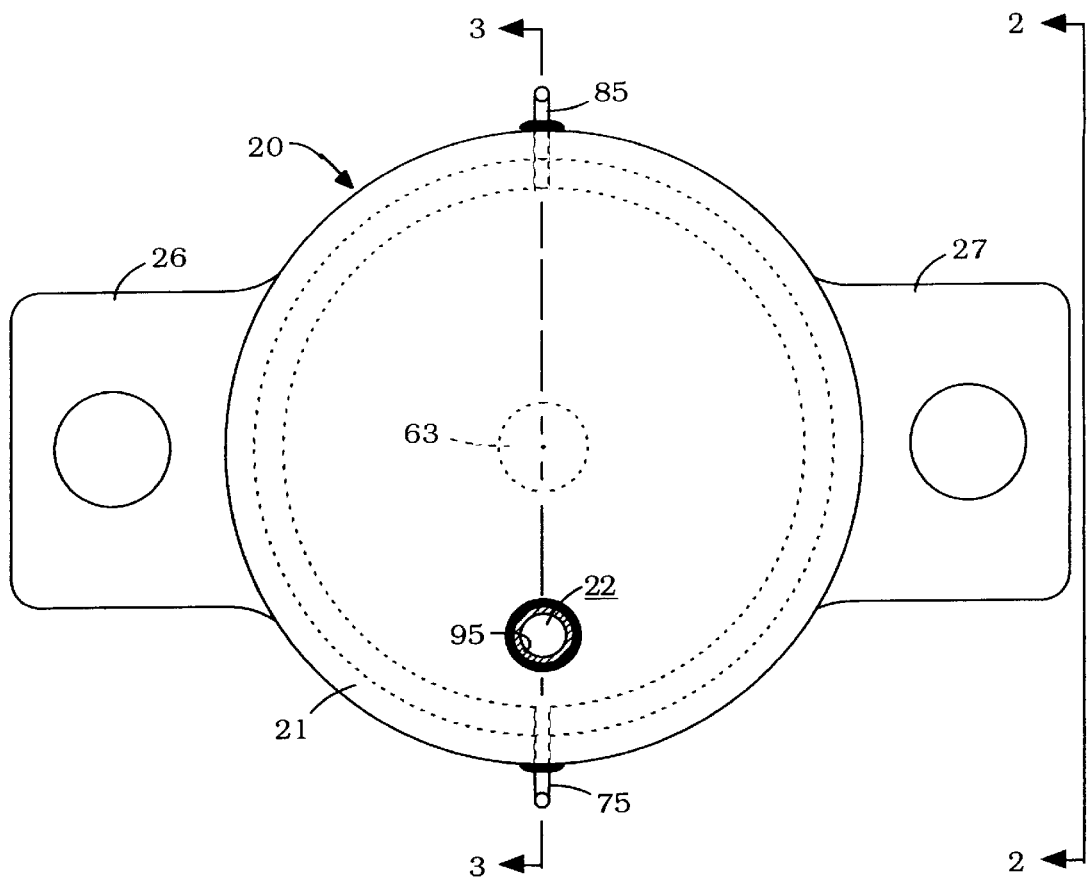
FIG. 1 is a top view of a normally "on" optical switch in accordance with the present invention.
Figure 2:
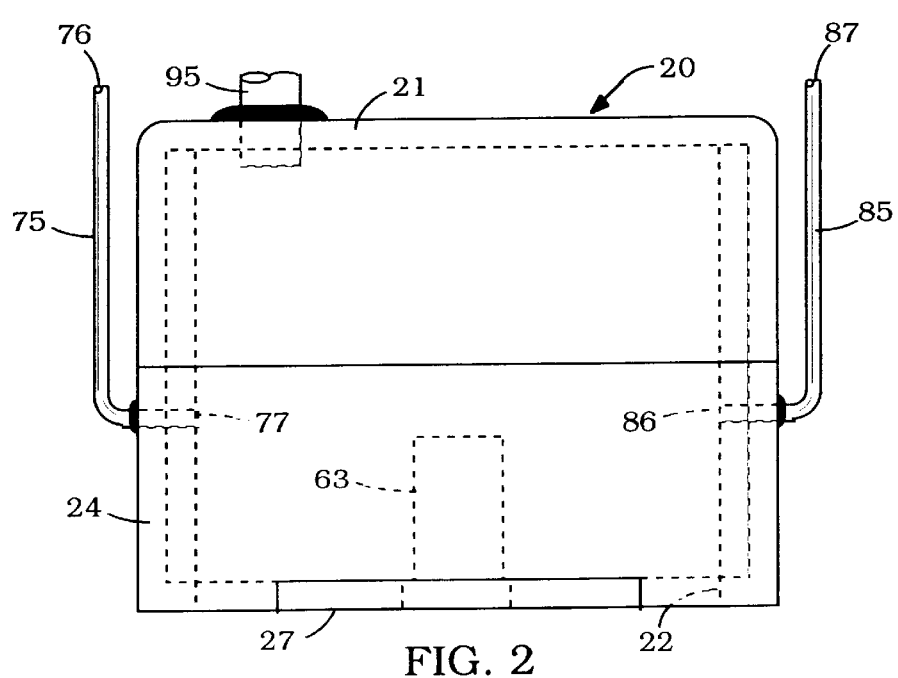
FIG. 2 is a side elevation view taken along plane 2—2 of FIG. 1.

In the drawing, FIGS. 1 to 4 illustrate one embodiment of an optical switch in accordance with the present invention; FIGS. 5 to 7 illustrate another. Both embodiments include a housing generally designated 20, a diaphragm 60, a fiber optic input line 75, a fiber optic output line 85, and a vent line 95. The only difference between the two embodiments is the structure of the optical barrier forming part of the switch. In the case of the embodiment illustrated in FIGS. 1 to 4, the switch includes an optical barrier 63 described below in more detail. In the case of the embodiment illustrated in FIGS. 5 to 7, the switch includes an optical barrier generally designated 65 and described below in more detail.

Common Features of Both Embodiments

Housing 20 is constructed from a cap 21 and a base sleeve 24, each of which is press fitted over a cylindrical pipe section or nipple 32. The integrity of the press fits may be enhanced with a sealing glue (not shown) to better ensure that fluids to which the switch is exposed during use cannot leak between the walls of the housing. Of course, the glue should be compatible with the fluids.

Sleeve 24 includes an inwardly extending annular flange 25 and a pair of diametrically opposed outwardly extending mounts 26, 27. Inner wall 23 of flange 25 defines a circular open end of housing 20.

Sleeve 24 further includes bores 28, 29 which are rotationally aligned with corresponding bores 33, 34 in pipe nipple 32. Together, such bores provide diametrically opposed openings through the wall of housing 20, such openings being sized to receive associated fiber optic lines 75, 85. Cap 21 includes an opening or bore 22 which is sized to receive tubular vent line 95. Lines 75, 85 and 95 are all secured in their respective bores utilizing glue or other suitable means to prevent the leakage of fluids between the lines and the bores.

Housing 20 can be made from various suitable materials including metals and plastics. Provided that the environment to which the housing is exposed is not hostile, a polypropylene plastic may be used.

Diaphragm 60 extends across the open end of housing 20 defined by inner wall 23 and is formed from a resilient fluid-proof material sealingly engaged with housing 20 by annular extensions 61, 62 of the material. As best seen in FIGS. 3 to 6, diaphragm 60 serves to define a region $R_i$ inside housing 20 and a region $R_o$ outside the housing.

Annular extension 61 of the diaphragm material is secured between flange 25 of sleeve 24 and the bottom of pipe nipple 32. Annular extension 62 is secured between the outer cylindrical wall surface of sleeve 24 and the inner cylindrical wall surface of pipe nipple 32. It will be understood that the perimeter of diaphragm 60 (viz. the line where it passes under pipe nipple 32 and merges with annular extension 61) is substantially circular.

Fiber optic input line 75 includes an input end 76 for receiving an optical input signal from an optical source (not shown) outside housing 20, and an output end 77 in region $R_i$ for providing the input signal as an optical output signal propagating within region $R_i$. Fiber optic output line 85 includes an input end 86 in region $R_i$ in optical alignment with output end 77 for receiving the propagating signal from line 75 and an output end 87 for transmitting the signal, when so received, as an optical output signal from the switch.

Vent line 95, only a short part of which is shown, is an elongated flexible plastic tube which, when connected to housing 20 through bore 22 provides a vent for reaching from region $R_i$ inside housing 20 to a region of ambient pressure (not depicted) distant from the housing. The pressure within housing 20 is thereby maintained at ambient pressure regardless of the pressure in outside region $R_\phi$ immediately outside housing. In effect, the switch is rendered insensitive to changes in ambient pressure—a result which will be desirable unless expected changes in ambient pressure are insignificant, or significant changes in ambient pressure are the very thing that one wishes to sense. Further, and as noted above, such a vent enables the sealed integrity of the switch to be readily checked. More particularly, if housing 20 is completely immersed in water or some other liquid and air is then forced down the vent, any resulting bubbles from the switch will indicate that the housing is not properly sealed.

As in the case of housing 20, diaphragm 60 may be made from various suitable materials. One material which is suitable for various environments is elastic latex. However, it should be noted that latex would not be suitable for all environments. For example, in an environment such as diesel fuel an elastic neoprene or nitrile rubber would be preferred.

Figure 3:
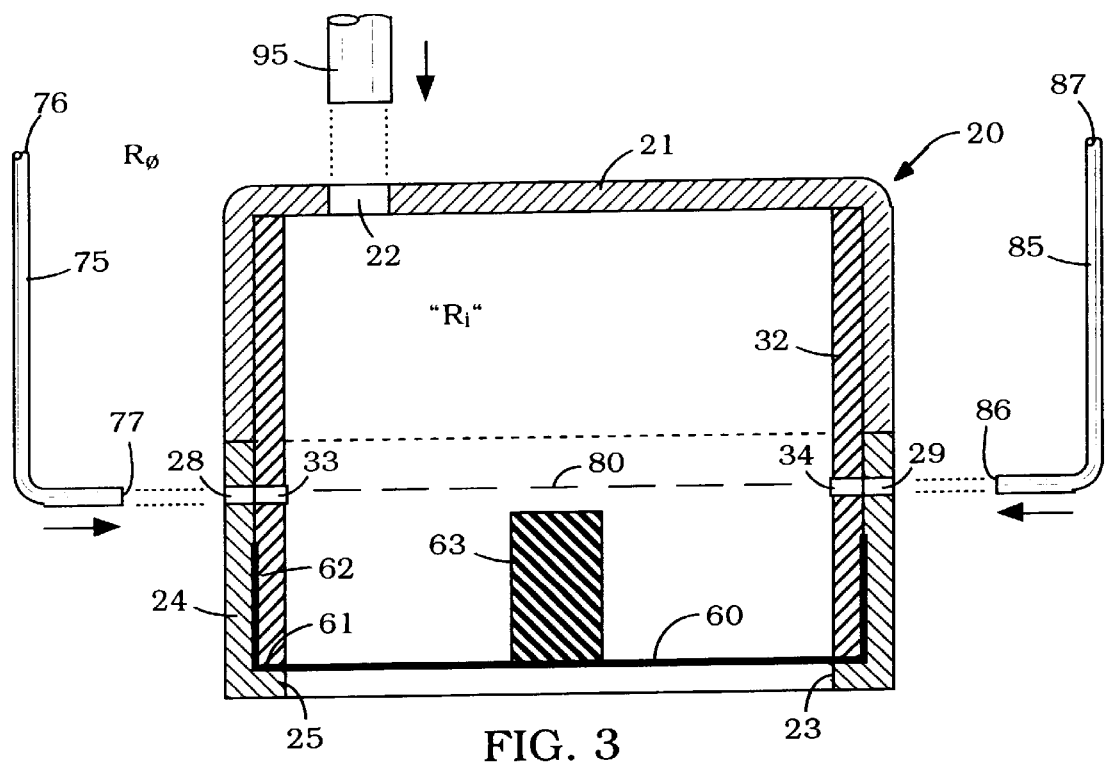
FIG. 3 is a partially exploded and partially sectioned view of the optical switch shown in FIG. 1, the switch being shown in an "on" switching state. The section is taken along cutting plane 3—3 of FIG. 1.
Figure 4:
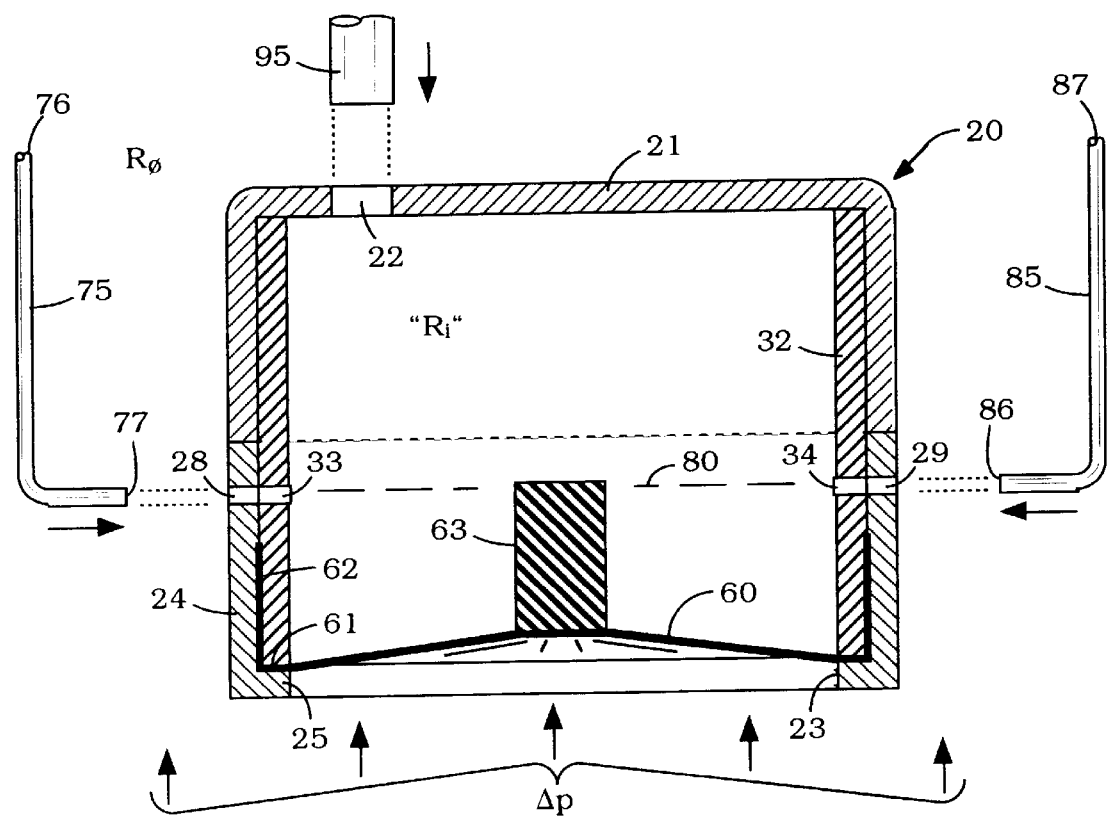
FIG. 4 is a partially exploded and partially sectioned view of the optical switch shown in FIG. 1, the switch being shown in an "off" switching state.
Figure 5:
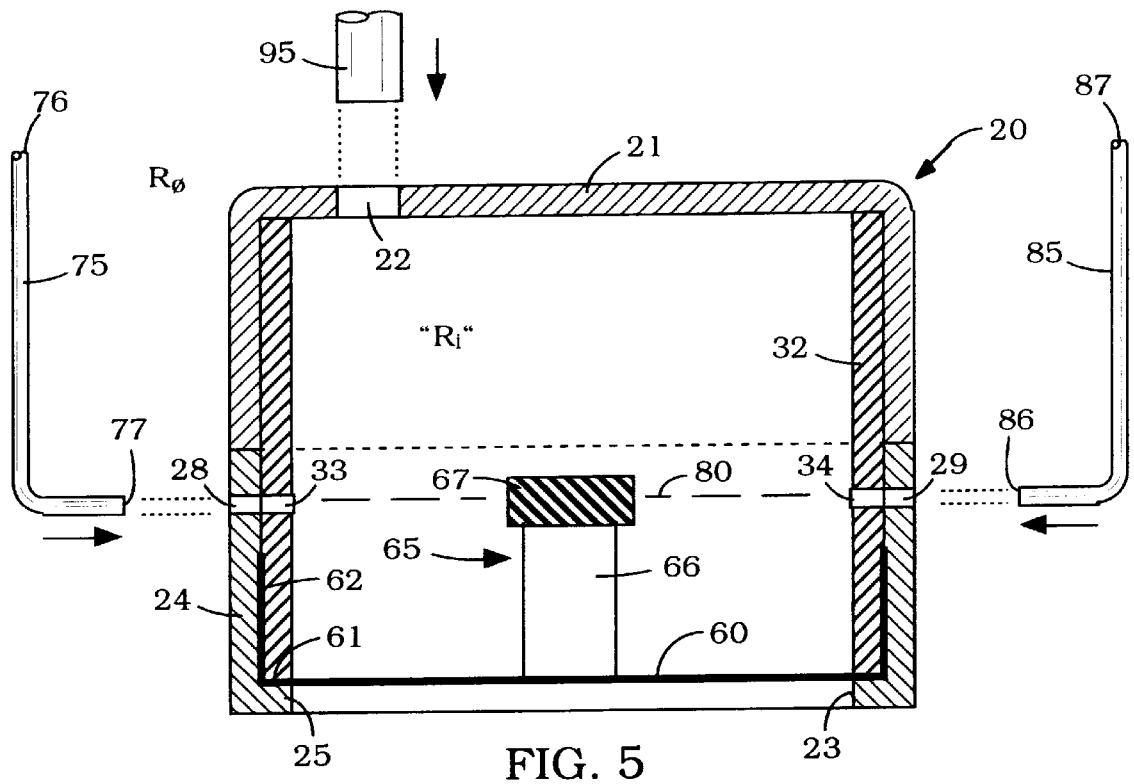
FIG. 5 is a partially exploded and partially sectioned view of a normally "off" optical switch in accordance with the present invention, the switch being shown in an "off" switching state.
Figure 6:
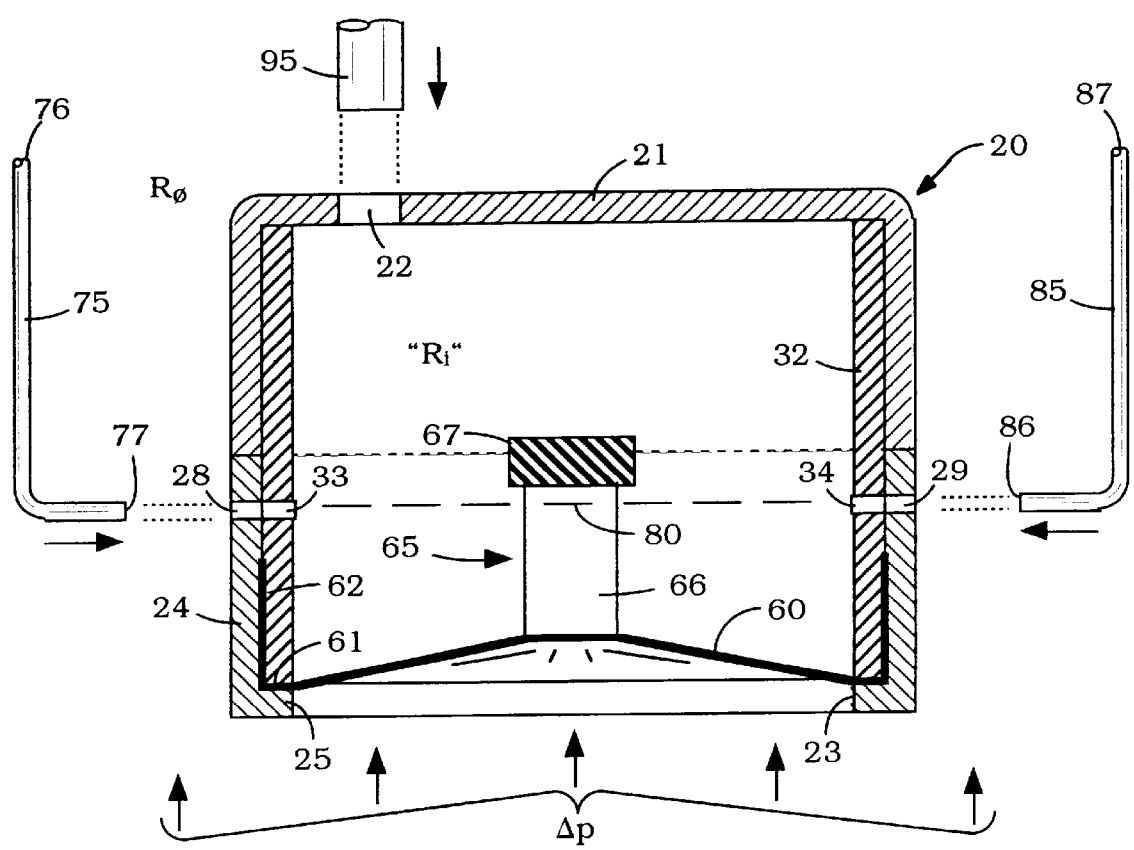
FIG. 6 is a partially exploded and partially sectioned view of the optical switch shown in FIG. 5, the switch being shown in an "on" switching state.

When the switch depicted by FIGS. 1 to 4 or the switch depicted by FIGS. 5 to 7 is initially assembled, the pressure inside housing 20 (region $R_i$) and the pressure outside the housing (region $R_\phi$) will be equal. So long as these pressures remain equal, the state of diaphragm 60 will be basically as depicted in FIGS. 3 and 5; viz. extending in a flat plane across the open end of the housing. Subsequently, if the pressure in outside region $R_\phi$ increased, then diaphragm 60 will be forced to stretch or bulge upwardly as depicted in FIGS. 4 and 6. The volume of region $R_i$ will reduce until the spring return force of the diaphragm is sufficient to balance the increased pressure.

Embodiment Shown in FIGS. 1 to 4

As noted above, the unique feature of the embodiment shown in FIGS. 1 to 4 compared to the embodiment shown in FIGS. 5 to 7 is optical barrier 63. Barrier 63 has an optically opaque cylindrical block construction centrally positioned on and extending upwardly from diaphragm 60 within region $R_1$. Thus, when diaphragm 60 bulges upwardly as shown in FIG. 4, then barrier 63 is lifted by a corresponding maximum distance upwardly. In other words, the movement of barrier 63 is maximally sensitive to changes in pressure within region $R_\phi$, relative to region $R_i$.

If diaphragm 60 is made from a latex material as noted above, then barrier 63 advantageously may be made from the same or similar material heat welded to the diaphragm to form a single piece.

When barrier 63 is in the position or switching state shown in FIG. 3, there is a clear line of sight 80 from output end 77 of fiber optic input line 75 to input end 86 of fiber optic output line 85. In contrast, when barrier 63 is in the position shown or switching states shown in FIG. 4, the line of sight 80 is blocked.

In the operation of the embodiment shown in FIGS. 1 to 4, an optical input signal received at input end 76 of line 75 is transmitted along line 70 to output end 77. Provided that the line of sight 80 is not blocked by optical barrier 63, then the input signal will propagate through region $R_i$ from output end 77 of line 70 to input end 86 of line 85. Line 85 transmits the received input signal to output end 87 of line 85.

Normally, the line of sight 80 is not blocked by barrier 63. That is, the normal state of diaphragm 60 is the initial state or condition depicted in FIG. 3 where the diaphragm extends in a horizontal plane thereby positioning barrier 63 below line of sight 80. Since an input signal will be transmitted through the switch when diaphragm 60 is in this state, the switch may be considered as a normally "on" switch.

Subsequently, if the pressure in outside region $R_i$ increases relative to the pressure in inside region $R_i$ by a sufficient amount as represented by arrows $\Delta p$ in FIG. 4, then optical barrier 63 will be elevated to block the line of sight 80. Then, any input signal received at input end 76 of line 75 will fail to appear at output end 87 of line 85. In this condition, the switch is in an "off" state.

Strictly, it will be noted that as the switch alters from an "off" state to an "on" state, or vice-versa, there will be a transition region where the switch is neither fully "off" nor fully "on". In this region, barrier 63 impedes only a part of the line of sight 80 thereby permitting a portion of any input signal present on line 75 to propagate to line 85. However, as a practical matter, a threshold can be defined where the switch is considered by definition to be "or" if the intensity of an optical signal present at output end 87 of line 85 is above the threshold—and otherwise is considered by definition to be "off".

It will be understood that the pressure increase $\Delta p$ required to switch from an "on" state to an "off" state will be a function of the height of optical barrier 63 above diaphragm 60. A switch having an optical barrier with less height than barrier 63 would require a greater pressure increase to switch from "on" to "off". Conversely, a switch having a barrier with more height than optical barrier 63 would require a lesser pressure increase to switch from "on" to "off". For a given housing 20 and diaphragm 60, the switching threshold can be conveniently changed merely by substituting one barrier for another.

Embodiment Shown in FIGS. 5 to 7

As noted above, the unique feature of the embodiment shown in FIGS. 5 to 7 compared to the embodiment shown in FIGS. 1 to 4 is optical barrier 65. Like barrier 63, barrier 65 has an optically opaque construction and advantageously may be made from material the same as or similar to diaphragm 60. It is centrally supported by diaphragm 60 and extends upwardly within region $R_i$. However, unlike optical barrier 63, optical barrier 65 does not have a simple cylindrical block construction. As best seen in FIG. 7, barrier 65 has an overall cylindrical construction, but includes a rectangular opening or aperture 66 which passes through the barrier below solid upper portion 67 of the barrier.

As best seen in FIG. 5, the height of barrier 65 is arranged such that upper portion 67 normally blocks line of sight 80.

Necessarily, the switch is in an "off" state in this condition. However, if the pressure in outside region $R_i$ increases by a sufficient amount over the pressure in inside region $R_i$ (as represented by arrows Δp in FIG. 6), then optical barrier 65 is elevated is shown in FIG. 6 to a position where there is a clear line of sight 80 through opening 66. In this condition, the switch is in an "on" state. In this position, opening 66 provides a window through which an optical signal may propagate from output end 77 of line 75 to input end 86 of line 85.

In effect, the use of optical barrier 65 instead of a barrier such as optical barrier 63 serves to make the switch shown in FIGS. 5 to 7 a normally "off" switch rather than a normally "on" switch. The pressure increase Ap required to switch from an "off" state to an "on" state is a function of the height of aperture 66 above diaphragm 60. A switch having an aperture with less height than aperture 66 would require a greater pressure increase to switch from "off" to "on". Similarly, a switch having a barrier with more height than aperture 66 would require a lesser pressure increase to switch from "on" to "off". Thus, for a given housing 20 and diaphragm 60, and as in the case of the embodiment shown in FIGS. 1 to 4, the switching threshold can be conveniently changed merely by substituting one barrier for another. As well, it will now be understood that for a given housing 20 and diaphragm 60 the character of the switch as a normally "on" switch or as a normally "off" switch can be conveniently altered merely by substituting a barrier such as barrier 65 for a barrier such as barrier 63 (or vice-versa).

Elimination of Vent

While an optical switch in accordance with the present invention may advantageously include a vent, a vent is not considered essential for all situations. For example, a switch similar in construction to the embodiment shown in FIGS. 1 to 4, or to the embodiment shown in FIGS. 5 to 7, could be constructed without a vent. Such a result would be achieved by the elimination of vent line 95 and bore 22 in cap 21. In this situation, housing 20 would be completely sealed from the time of assembly. Subsequently, if the pressure in outside region $R_o$ increased, then diaphragm 60 would be forced to stretch or bulge upwardly generally as described above. However the upward movement of barrier 63 or barrier 65, as the case may be, would be less than the corresponding movement that would occur if a vent was present. In the absence of a vent, the movement would be opposed not only by the spring return force of diaphragm 60 but also by increasing pressure resulting from the volume reduction of in region $R_i$ which accompanies such movement.

Of course, in the absence of a vent, then the sealed integrity of the switch could not be checked in the manner discussed above. Further, other disadvantages may arise. For example, in the case of an embodiment similar to that shown in FIGS. 1 to 4, or to that shown in FIGS. 5 to 7, but without a vent, a temporary hole or opening in cap 21 may be required during the process of assembly. Otherwise, as cap 21 is fitted over pipe nipple 32 with diaphragm 60 already in place, or vice-versa, there may be a tendency for pressure to build up in region $R_i$ sufficient to bulge the diaphragm outwardly or downwardly from the neutral positions shown in FIGS. 3 and 5. As well, a change in ambient pressure after the time of assembly would produce a corresponding outward or inward bulge of diaphragm 60 from its neutral position. The result would be to alter the apparent switching threshold of the switch. If any expected changes in ambient pressure were insignificant compared to the increase in pressure required to activate the switch, then the alteration may be considered immaterial. Otherwise, unless the object of the switch was to sense significant changes in ambient pressure, the alteration may compromise the desired accuracy of measurements made with the switch.

Liquid Level Monitor

Referring now to FIG. 8, there is shown an apparatus or probe generally designated 100 which includes a plurality of optical switches $SW_1$, $SW_2$, $SW_3$ in accordance with the present for monitoring the level of a liquid. All such switches may be normally "on" switches as described above in relation to FIGS. 1 to 4 or, alternately, may be normally "off" switches as described above in relation to FIGS. 5 to 7. Depending upon the case, each switch operates in the manner described above. For example, if all switches are normally "on" switches, then they will progressively turn "off" as the liquid level rises from a level below the bottom of switch $SW_1$ to a level above the bottom of switch $SW_3$. Conversely, if all switches are normally "off" switches, then they will progressively turn "on" as the liquid level rises from a level below the bottom of switch $SW_1$ to a level above the bottom of switch $SW_3$. As depicted in FIG. 8, liquid is indicated at a level 200 which is sufficient to activate all switches except switch $SW_3$ either "off" or "on", as the case may be. Switch $SW_3$ is not activated in FIG. 8 because it lies above level 200.

As can be seen, switches $SW_1$, $SW_2$, $SW_3$ are held in spaced succession by a support or framework comprising threaded tie rods 110, 112 which are joined across their tops by a bracket 120, and which extend through and are coupled with opposed mounts 26, 27 of each switch. Bracket 120 includes an eyebolt 125 to facilitate securing the support in a desired position. If desired, a similar bracket with or without a similar eyebolt could be provided at the lower end of the support below the bottom-most switch. If needed, such a bracket could be used to provide added strength and stability by relieving undue stress on the switches themselves. Further, such a bracket would serve to shield the bottom-most switch from foreign objects that might otherwise strike its diaphragm (not shown in FIG. 8) from below.

Each successive switch $SW_1$, $SW_2$, $SW_3$ is spaced from its immediately preceding switch by an equal distance "d". Further, each successive switch includes a fiber optic input line $I_1$, $I_2$, or $I_3$, as the case may be, a fiber optic output line $Ø_1$, $Ø_2$, or $Ø_3$, as the case may be, and a vent line comprising an individual line segment $V_1$, $V_2$, or $V_3$, as the case may be, and a common line segment $V_0$. Common line segment $V_0$ terminates at its upper end 150 in a region $R_a$ of ambient pressure. Upper end 150 is directed downwardly to obstruct the flow of any liquid through the vent lines.

Each fiber optic input line $I_1$, $I_2$, $I_3$ is like input line 75 discussed above and receives an optical input signal $s_0$ from an optical source (not shown). Signal $s_0$ is then routed along cable 130 to its associated switch $SW_1$, $SW_2$, or $SW_3$, as the case may be. Each fiber optic output line $Ø_1$, $Ø_2$, $Ø_3$ is like output line 85 discussed above and transmits any signal that it receives within its associated switch housing as an optical output signal which is then routed along cable 140 where it ultimately appears as an output signal $s_1$, $s_2$, or $s_3$, as the case may be.

Of course, it will be understood that any given switch $SW_1$, $SW_2$, $SW_3$ will not activate (viz. turn "off" or "on" depending upon whether it is a normally "on" or normally "off" switch) until it becomes immersed to a sufficient depth in the liquid. If the switch is immersed only to a relatively shallow depth, then the added fluid or liquid pressure on the diaphragm of the switch (viz. like diaphragm 60 as described above) will be insufficient to elevate the optical barrier of the switch by an amount sufficient to produce the desired switching action. Thus if the diaphragm of a given switch is meant to sense or monitor a particular level of liquid, then the switch necessarily must be positioned at a predetermined distance below that level. The required distance will depend upon the sensitivity of the switch and the density of the liquid but can be readily determined or calibrated for a given design of switch merely by testing the switch at various depths in a sample of the liquid.

In operation, and apart from transitional states where optical signals between lines $I_1, I_2, I_3$ and lines $\emptyset_1, \emptyset_2,$ or $\emptyset_3$ are only partially blocked, the magnitude of output signals $s_1, s_2, s_3$, will be either $0$ or $s_0$ depending upon whether the associated switch $SW_1, SW_2, SW_3$ is in an "off" state or an "on" state. Various means well known to those skilled in the art may be used to transmit signal $s_0$. Likewise, various well known means may be used to receive signals $s_1, s_2, s_3$ and to display or otherwise annunciate their status. In a most basic system, and provided that the fiber diameter of lines $\emptyset_1, \emptyset_2,$ or $\emptyset_3$ is sufficiently large, one may simply observe, visually, whether light is or is not present at the output of the lines as a measure of whether one or more of the associated switches have been activated by the level of a liquid being monitored. For example, a 1 mm diameter acrylic fiber line is sufficient for visual observation.

Since switches $SW_1, SW_2, SW_3$ are vented to region $R_a$ of ambient pressure, it will be appreciated that their operation will be unaffected by any changes in ambient pressure. The pressure inside each switch will always correspond to ambient pressure.

In any specific application, it will be understood that the total number of switches may be more or less thin three switches shown in FIG. 8. Likewise, the length of tie rods 110, 112 and the relative scale of distance "d" between switches may be longer or shorter than that depicted in FIG. 8. Further, the distance "d" between successive switches need not be the same. All of this will depend upon the maximum depth of liquid to be measured and the desired measurement resolution at lesser depths. For example, if it was desired to monitor the liquid level within a tank or other liquid container (not shown) having a uniform horizontal cross section, and to do so at 25% increments representing ¼ full, ½ full, ¾ full and completely full, then four switches would be required at intervals of h/4 where level h represents a full tank. However, if the tank or container had a non-uniform horizontal cross-section, then uniformly spaced switches could obviously not represent equal increments of fullness. To measure equal increments of fullness, the spacing between successive switches would have to be made correspondingly non-uniform. With switches mounted on tie rods in the manner shown in FIG. 8, the adjustments necessary to achieve a required non-uniform spacing can be readily made along the length of the tie rods.

It should be noted that switches $SW_1, SW_2, SW_3$ may be supported by means other than the particular means shown in FIG. 8. Further, with respect to the embodiment shown in FIG. 8, it should be noted that only one of the two tie rods 110, 111 shown may be considered to suffice for some cases. In such cases it is contemplated that an eyebolt like eyebolt 125, or other suitable securing means, would be located at or made integral with the top of the one tie rod used. An advantage of only tie rod is that position of the switches can be adjusted more easily. A disadvantage is that the switches are more exposed to damage from foreign objects.

A variety of modifications, changes and variations to the invention are possible within the spirit and scope of the following claims. The invention should not be considered as restricted to the specific embodiments that have been described and illustrated with reference to the drawings.

I claim:

1. An optical switch operatively sensitive to a fluid pressure differential, said switch comprising:
   (a) a housing having an open end;
   (b) a fluid-proof diaphragm sealingly engaged with said housing across said open end to define a region inside said housing and a region outside said housing, said diaphragm being formed from a thin elastic material resiliently stretchable between a first switching state which subsists when fluid pressure in said outside region equals fluid pressure in said inside region and a second switching state which subsists when fluid pressure in said outside region exceeds fluid pressure in said inside region by a predetermined amount;
   (c) a fiber optic input line having:
      (i) an input end for receiving an optical input signal from an optical source outside said housing; and,
      (ii) an output end in said inside region for providing said optical input signal as an optical output signal propagating within said inside region;
   (d) a fiber optic output line having:
      (i) an input end in said inside region in optical alignment with said output end of said input line for receiving said propagating signal; and,
      (ii) an output end for transmitting said propagating signal, when so received, as in optical output signal from said switch; and,
   (e) an optical barrier supported by said diaphragm and extending within said inside region for blocking the propagation of said optical signal from said output end of said input line to said input end of said output line when said diaphragm is in one of said switching states and for permitting the propagation of said optical signal from said output end of said input line to said input end of said output line when said diaphragm is in the other one of said switching states.

2. An optical switch as described in claim 1, wherein said optical barrier is centrally positioned on said diaphragm.

3. An optical switch as described in claim 2, wherein said optical barrier permits propagation of said optical signal when said diaphragm is in said first switching state and blocks propagation of said optical signal when said diaphragm is in said second switching state.

4. An optical switch as described in claim 2, wherein said optical barrier permits propagation of said optical signal when said diaphragm is in said second switching state and blocks propagation of said optical signal when said diaphragm is in said first switching state.

5. An optical switch as described in claim 2, wherein said open end has a circular perimeter.

6. An optical switch as described in claim 5, wherein said optical barrier permits propagation of said optical signal when said diaphragm is in said first switching state and blocks propagation of said optical signal when said diaphragm is in said second switching state.

7. An optical switch as described in claim 5, wherein said optical barrier permits propagation of said optical signal when said diaphragm is in said second switching state and blocks propagation of said optical signal when said diaphragm is in said first switching state.

8. Apparatus for monitoring the level of a liquid, said apparatus comprising:
   (a) a plurality of optical switches as described in claim 1, the said diaphragm of each given one of said switches being stretchable between said first and second switching states in response to the rise of said liquid from a level below the given switch to a level at which the given switch is immersed to a predetermined depth in said liquid; and, a support for holding said switches in spaced succession.

9. Apparatus as described in claim 8, wherein successive ones of said switches are spaced equidistant from each other.

10. Apparatus as described in claim 9, wherein said optical barrier of each given one of said switches is centrally positioned on said diaphragm of said given switch.

11. Apparatus as described in claim 10, wherein said optical barrier of each given one of said switches permits propagation of said optical signal when said diaphragm of said given switch is in said first switching state and blocks propagation of said optical signal when said diaphragm of said given switch is in said second switching state.

12. Apparatus as described in claim 10, wherein said optical barrier of each given one of said switches permits propagation of said optical signal when said diaphragm of said given switch is in said second switching state and blocks propagation of said optical signal when said diaphragm of said given switch is in said first switching state.

13. Apparatus as described in claim 10, wherein said open end of each of said switches has a circular perimeter.

14. Apparatus as described in claim 13, wherein said optical barrier of each given one of said switches permits propagation of said optical signal when said diaphragm of said given switch is in said first switching state and blocks propagation of said optical signal when said diaphragm of said given switch is in said second switching state.

15. Apparatus as described in claim 13, wherein said optical barrier of each given one of said switches permit, propagation of said optical signal when said diaphragm of said given switch is in said second switching state and blocks propagation of said optical signal when said diaphragm of said given switch is in said first switching state.

16. Apparatus as described in claim 8, wherein said support comprises a tie rod, said switches being mounted at selected positions along the length of said tie rod.

17. Apparatus as described in claim 8, wherein said support comprises a tie rod, said switches being mounted at adjustable positions along the length of said tie rod.

18. Apparatus as described in claim 8, wherein each of said switches includes an associated vent line for providing air flow communication between said region inside said housing of the associated switch and an external region of ambient pressure while any one or more of said switches are immersed in a fluid.

19. An optical switch as described in claim 1, further including a vent line for providing airflow communication between said region inside said housing and an external region of ambient pressure while said switch is immersed in a fluid.

* * * * *

UNITED STATES PATENT AND TRADEMARK OFFICE
CERTIFICATE OF CORRECTION

PATENT NO. : 6,125,218
DATED : September 26, 2000
INVENTOR(S) : Ashley C Humphrey It is certified that error appears in the above-identified patent and that said Letters Patent is hereby corrected as shown below:

Column 6,
Line 38, delete "or" and substitute -- on --.

Column 7,
Line 5, after "elevated", delete "is" and substitute -- as --.
Line 14, after "increase", delete "Ap" and sbstitute -- Δp --.

Column 9,
Line 30, delete "thin" and substitute -- than --.

Claim 1, Column 10,
Line 26, delete "in" and substitute -- an --.

Claim 15, Column 12,
Line 4, delete "permit," and substitute -- permits --.

Signed and Sealed this

Twenty-fourth Day of July, 2001

*Attest:*

NICHOLAS P. GODICI
*Attesting Officer*     *Acting Director of the United States Patent and Trademark Office*